United States Patent
Magnezi et al.

(10) Patent No.: US 11,422,917 B2
(45) Date of Patent: Aug. 23, 2022

(54) DERIVING SOFTWARE APPLICATION DEPENDENCY TREES FOR WHITE-BOX TESTING

(71) Applicant: Red Hat, Inc., Raleigh, NC (US)

(72) Inventors: Nir Magnezi, Petah Tikva (IL); Arie Bregman, Gan Yavne (IL)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/523,632

(22) Filed: Jul. 26, 2019

(65) Prior Publication Data

US 2021/0026756 A1   Jan. 28, 2021

(51) Int. Cl.
*G06F 11/36* (2006.01)
*G06F 8/41* (2018.01)

(52) U.S. Cl.
CPC .......... *G06F 11/3612* (2013.01); *G06F 8/433* (2013.01); *G06F 11/3664* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | | |
|---|---|---|---|---|
| 5,694,540 A * | 12/1997 | Humelsine | ................ | G06F 8/71 714/33 |
| 7,096,459 B2 * | 8/2006 | Keller | ................ | G06F 11/0709 714/E11.027 |
| 7,437,723 B1 * | 10/2008 | Kihara | ................ | H04L 41/0803 717/124 |
| 7,814,465 B2 * | 10/2010 | Liu | ..................... | G06F 9/44589 717/126 |
| 8,141,059 B2 * | 3/2012 | Ding | ........................ | G06F 8/71 717/133 |

(Continued)

FOREIGN PATENT DOCUMENTS

CN            106547678 B        3/2019

OTHER PUBLICATIONS

Pham, V., et al., "Model-Based Whitebox Fuzzing for Program Binaries," School of Computing, National University of Singapore, Singapore, Sep. 3-7, 2016, https://mboehme.github.io/paper/ASE16.pdf.

*Primary Examiner* — Jason D Mitchell
(74) *Attorney, Agent, or Firm* — Kilpatrick Townsend & Stockton LLP

(57) ABSTRACT

Software application dependency trees can be generated and used for white-box testing. In some examples, a method may involve receiving a request to generate a dependency tree for a first software application associated with a computing device. The method may also include identifying a set of software applications also associated with the computing device, each of which the first software application is determined to be dependent upon based on information included in a specification for the first software application. The method may also include receiving, by the computing device with respect to the set of software applications, a corresponding set of dependency trees. The method may further include incorporating each of the dependency trees in the set of dependency trees into the dependency tree for the first software application via a respective incorporation point, and returning the dependency tree for the first software application in response to the request.

20 Claims, 6 Drawing Sheets

(56) References Cited

U.S. PATENT DOCUMENTS

| | | | | |
|---|---|---|---|---|
| 8,578,336 | B1* | 11/2013 | Wiradarma | G06F 11/3684 717/125 |
| 8,762,130 | B1* | 6/2014 | Diaconescu | G06F 40/253 704/7 |
| 8,776,047 | B2 | 7/2014 | Wookey | |
| 9,009,666 | B1* | 4/2015 | Martindale | G06F 11/368 717/122 |
| 9,047,413 | B2 | 6/2015 | Romdhane | |
| 9,367,425 | B1* | 6/2016 | Hale | G06F 3/0481 |
| 10,210,076 | B2 | 2/2019 | Huang et al. | |
| 10,255,167 | B2 | 4/2019 | Adinarayan et al. | |
| 10,642,719 | B1* | 5/2020 | Balasubramanian | G06F 11/3055 |
| 10,839,432 | B1* | 11/2020 | Konig | G06Q 30/0281 |
| 2003/0135619 | A1* | 7/2003 | Wilding | G06Q 10/06 709/225 |
| 2004/0268311 | A1* | 12/2004 | Pizzoli | G06F 9/451 717/124 |
| 2005/0203957 | A1* | 9/2005 | Wang | G06F 16/86 |
| 2006/0015852 | A1* | 1/2006 | Parkinson | G06F 11/3688 717/126 |
| 2008/0244551 | A1* | 10/2008 | Jung | G06F 9/445 717/163 |
| 2010/0229163 | A1* | 9/2010 | Rolland | G06F 21/14 717/159 |
| 2010/0281488 | A1* | 11/2010 | Krishnamurthy | G06F 11/3664 715/771 |
| 2011/0055813 | A1* | 3/2011 | Calendino | G06F 11/3672 717/124 |
| 2011/0271253 | A1* | 11/2011 | Bnayahu | G06F 11/3676 717/123 |
| 2012/0151455 | A1* | 6/2012 | Tsantilis | G06F 11/3688 717/132 |
| 2014/0033175 | A1* | 1/2014 | Lee | G06F 11/3684 717/124 |
| 2015/0026664 | A1* | 1/2015 | Bartley | G06F 11/3676 717/124 |
| 2015/0278075 | A1* | 10/2015 | Loganathan | G06F 11/3684 714/38.1 |
| 2015/0378871 | A1* | 12/2015 | Asthana | G06F 11/3628 717/122 |
| 2016/0253625 | A1* | 9/2016 | Casey | G06F 9/44521 717/101 |
| 2017/0075797 | A1* | 3/2017 | Ekambaram | G06F 11/3688 |
| 2018/0107585 | A1* | 4/2018 | Ramesh | G06F 11/3664 |
| 2018/0136933 | A1* | 5/2018 | Kogan | G06F 16/26 |
| 2018/0167480 | A1* | 6/2018 | Jain | G06F 8/30 |
| 2018/0300228 | A1* | 10/2018 | Beyel, III | G06F 11/3688 |
| 2018/0336123 | A1* | 11/2018 | Benes | G06F 11/3688 |
| 2018/0373507 | A1* | 12/2018 | Mizrahi | G06F 8/433 |
| 2019/0227794 | A1* | 7/2019 | Mercilie | G06F 8/36 |
| 2019/0392070 | A1* | 12/2019 | Johnson | G06F 16/2443 |
| 2020/0159650 | A1* | 5/2020 | Deshpande | G06F 8/433 |
| 2020/0167264 | A1* | 5/2020 | Bregman | G06F 11/3636 |
| 2020/0218533 | A1* | 7/2020 | Sharma | G06F 11/3624 |
| 2020/0242254 | A1* | 7/2020 | Velur | G06F 21/562 |
| 2020/0249936 | A1* | 8/2020 | Barfield, Jr. | G06F 8/433 |
| 2020/0319871 | A1* | 10/2020 | Fitzer | G06F 8/73 |
| 2020/0409824 | A1* | 12/2020 | Balasubramanian | G06F 11/3664 |

* cited by examiner

US 11,422,917 B2

1

DERIVING SOFTWARE APPLICATION DEPENDENCY TREES FOR WHITE-BOX TESTING

TECHNICAL FIELD

The present disclosure relates generally to enabling automated testing of software applications. More specifically, but not by way of limitation, this disclosure relates to automated generation of software application dependency trees and use of those software application dependency trees in testing.

BACKGROUND

Software application dependency trees are typically used to identify dependencies between different software applications associated with (e.g., installed upon or otherwise accessed by) a computing device. These software application dependency trees may be used to identify which software applications are needed for a particular software application to work. In one example, before installing a particular software application onto a computing device, that computing device may consult a software application dependency tree to identify each software application that needs to be installed on the computing device for the particular software application to function. In this example, each of those software applications may then be installed prior to installing the particular software application.

In some cases, software application dependency trees may be used during testing of a software application in order ensure that the software application is tested with respect to each of the software applications upon which it depends. In particular, white-box testing (also known as clear box testing, glass box testing, transparent box testing, and structural testing) is a method of software testing that tests internal structures or workings of an application, as opposed to its functionality. When an update is made to a particular software application, it may be beneficial to perform white-box testing on that software application to determine if the update has introduced any new bugs. This may require testing interactions between the updated software application and software applications upon which the updated software application is dependent.

2

Figure 6:
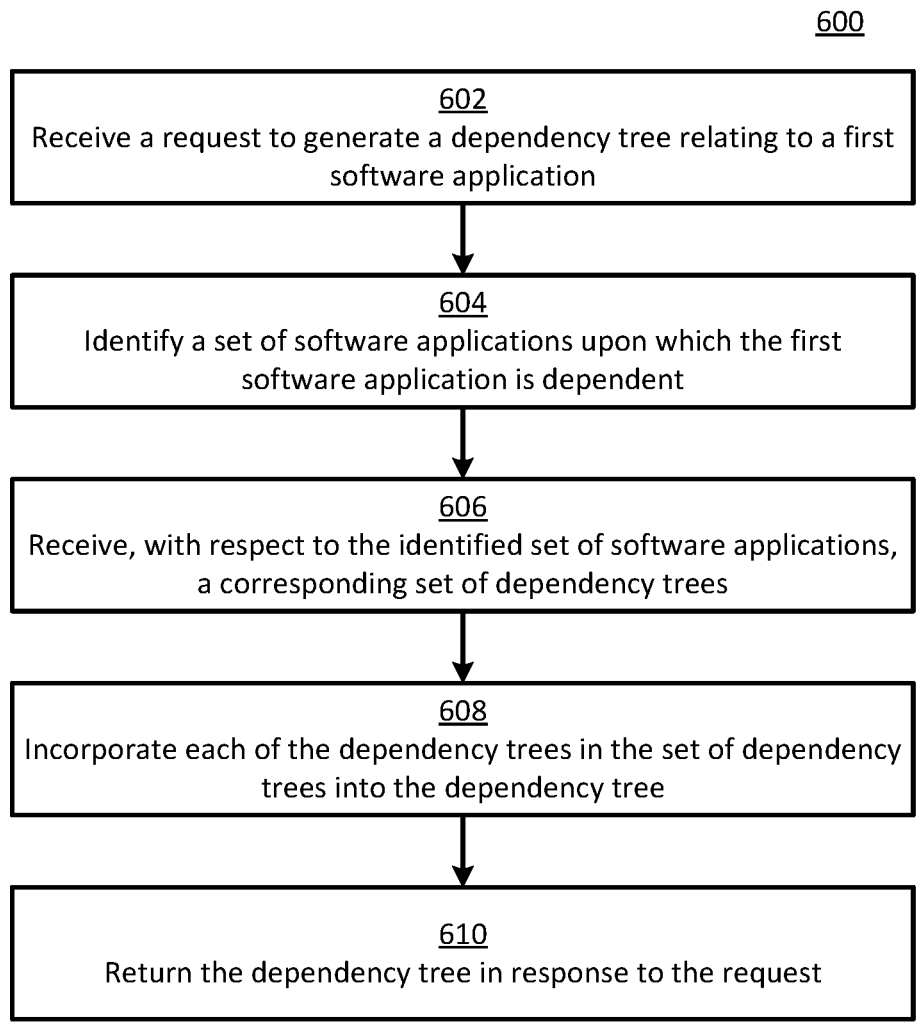

FIG. 6 is a flow chart of an example process for generating a software application dependency tree according to some aspects.

DETAILED DESCRIPTION

Many software applications may rely upon other software applications for at least a portion of their functionality. For example, a software application may make an application programming interface (API) call to another software application to provide some underlying functionality. This typically enables software developers to leverage existing software applications in their own work. By way of example, a software application (Application A) that provides locations of restaurants may interact with a software application (Application B) that provides access to mapping data. In this example, Application A may obtain mapping data from Application B via an API call and may then overlay that mapping data with restaurant data. In this way, Application A is able to provide its users with a map that includes restaurant data without needing to develop its own mapping data.

While software developers may rely upon other software applications to provide functionality in their own software application (i.e., a target software application), those software developers are often unable to fully anticipate how updates to a target software application will impact, or be impacted by, the software applications which provide the underlying functionality. Likewise, software developers are often unable to fully anticipate how updates to the software applications which provide the underlying functionality will impact, or be impacted by, the target software application. Hence, it may be beneficial for software developers to perform testing on their software application each time that an update is released (either to the target software application or the software applications upon which the target software application depends). However, software developers may forget to test the target software with respect to one or more software applications that provide underlying functionality. This is especially true if the target software application depends upon a large number of other software applications for underlying functionality or if one of those software applications newly incorporates functionality from a different software application of which the software developer is unaware. Furthermore, performing testing operations for a target software application each time that an update is released can be time consuming and tedious.

Some examples of the present disclosure can overcome one or more of the above-mentioned problems via a system that automatically generates software application dependency trees in order to enable automated white-box testing of software applications. More specifically, the system uses techniques which enable it to generate software application dependency trees in an automated recursive manner. To do this, the system parses a specification associated with a target software application for dependencies. The system records each of those dependencies, as well as information related to the dependencies, in a software application dependency tree. The system then recursively visits each of the software applications upon which the target software application is dependent and adds the resulting dependency tree to a software application dependency tree for the target software application. The resulting software application dependency tree may then be used to automate software testing. To do this, the system may determine the nature of each dependency in the software application dependency tree, identify appropriate testing template(s) based on the nature of the dependency, and perform automated testing using the identified template.

As a particular example, a user may wish to perform automated testing of a target software application. The user may execute the system to generate a software application dependency tree for the target software application. Upon execution, the system may parse a specification associated with the target software application to determine which other software applications the target software application is dependent upon. The system then records the dependency and the nature of the dependency in a software application dependency tree. By way of illustration, the system may record not only that Software A (the target software application) is dependent upon Software B, but which containers, files, libraries, services, etc. associated with Software B are used by Software A. The system then recursively generates software application dependency trees for each of the other software applications that the target software application is dependent upon and aggregates those generated software application dependency trees with the recorded dependencies to generate a software application dependency tree for the target software application.

Once a software application dependency tree has been generated for the target software application, the system may perform automated white-box testing for the target software application. For example, the system may have stored testing templates which may be used in relation to particular types of dependencies. The testing templates may be provided to the system by any suitable entity. For example, the system may be provided with testing templates for a target software application by a software developer or quality assurance agent associated with the target software application. Upon execution of automated white-box testing in accordance with the disclosure, the system may select testing templates to be executed based on the nature of the dependencies recorded in the software application dependency tree. For example, if the software application dependency tree has recorded that Software A makes use of a container associated with Software B, then the system may select a testing template for Software A which focuses on container usage. Upon execution of the white-box testing using the selected testing template, the system may detect whether one or more testing conditions set forth in the testing template have been satisfied. For example, upon executing a testing template in which a relied-upon container of Software B is killed, the system may detect whether Software A performs a graceful exit. By automatically generating a software application dependency tree and performing automated software testing using the techniques described herein, the system is able to ensure thorough testing of a target software application while reducing the time and resource commitment on software developers, thereby avoiding the abovementioned problems.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
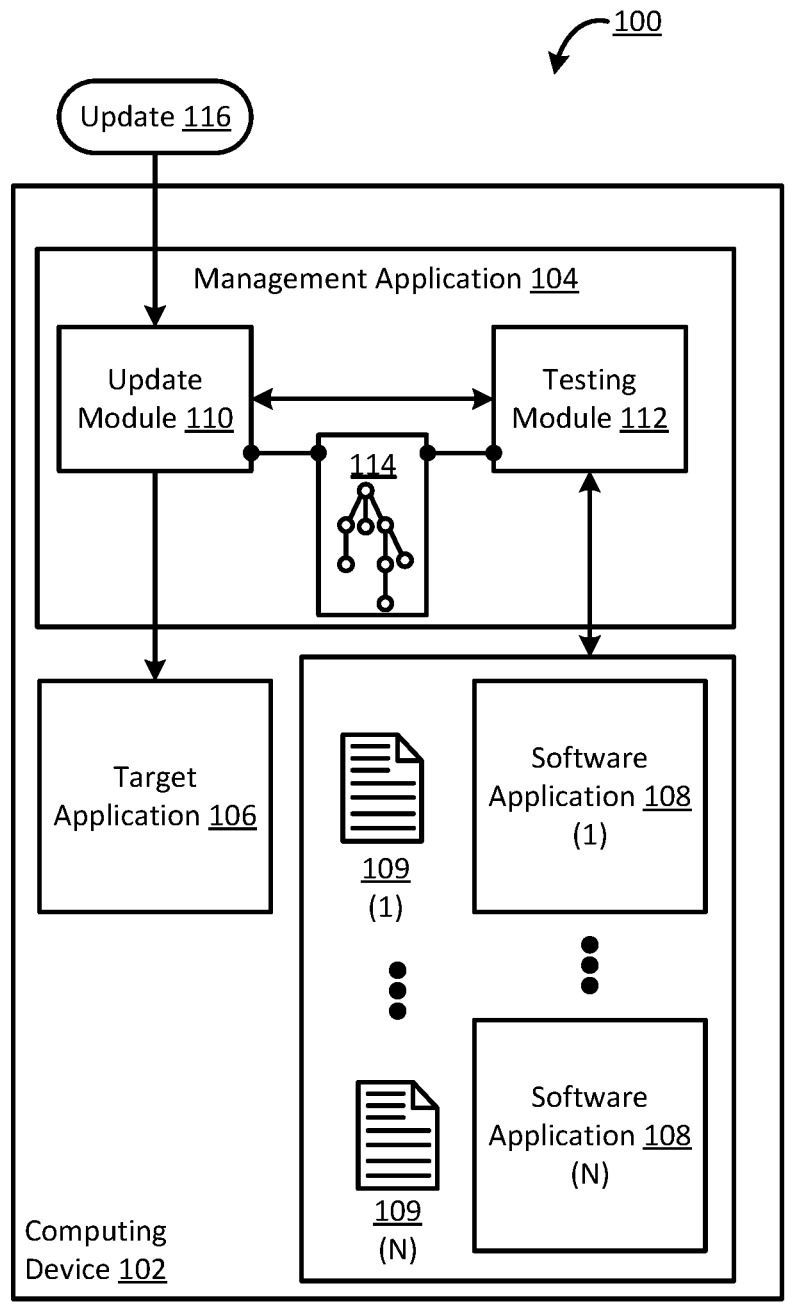
FIG. 1 is a block diagram of an example of a system for generating a software application dependency tree and performing automated testing for a target application according to some aspects.

FIG. 1 is a block diagram of an example of a system 100 for generating a software application dependency tree and performing automated testing for a target application 106 according to some aspects. The system 100 includes a computing device 102. Examples of the computing device 102 can include a desktop computer, laptop computer, or mobile phone. The computing device 102 may include a number of modules and/or software applications, which are each composed of computer-executable instructions. In an illustrative example, the computing device 102 may include a management application 104 in addition to a target application 106 as well as a number of other software applications 108 (1-N). It should be noted that while the management application 104 is depicted as being included in the computing device 102 which includes the target application 106, the management application 104 may alternatively be executed outside of the computing device 102. For example, the functionality attributed to the management application 104 may be provided by a separate computing device in communication with the computing device 102. In this example, the functionality may be accessed remotely or otherwise provided via a software as a service (SaaS).

As mentioned above, the computing device 102 may include a target application 106, which may be any software application that is executable for causing the computing device to perform some function. The target application 106 may have the ability to receive and implement updates. For example, the target application 106 may receive and implement software updates from a remote server that provides backend support for the target application 106. Additionally, the target application 106 may be executable via a script or other set of commands.

In addition to a target application 106, the computing device may also include any number of additional software applications 108. Some portion of the software applications 108 may provide functionality for the target application 106. This functionality may be provided via the use of an application programming interface (API) call associated with the respective software application 108. In some examples, the target application 106 may have a particular type of dependency on one or more of the software applications 108. For example, the target application may rely on functionality provided via a container, service, file, library, or some any other suitable component of the software application 108. While being depicted within the computing device 102, it should be noted that at least some of the additional software applications 108 may be located on a computing device remote to computing device 102. In some cases, functionality associated with those software applications may be accessed remotely via a network connection.

The computing device may store a number of software specifications 109 (1-N) which correspond to the additional software applications 108 (with each software application 108 having a corresponding software specification 109). A software specification may be a text-based document which includes details related to the installation/execution of a particular software application. In some cases, the software specification may include a number of dependency tags, which indicate dependencies of the related software. For example, a dependency tag in a software specification 109 may state "Requires: python>=1.3, perl." In this example, the related software application 108 may require that the computing device upon which it is installed have access to python version 1.3 or greater, as well as any version of perl. To parse a software specification 109 for dependencies, a computing device may identify a particular section of the software specification 109 (e.g., a dependency tag section) and may parse the information included in that section. Alternatively, the computing device may parse the text of the software specification 109 to identify some key or tag (e.g., the word "Requires:") and may identify a dependency associated with that key or tag. Software specifications 109 may be provided by a developer of the corresponding software application 108.

The computing device 102 may also include a management application 104. Management application 104 may be any software application configured to perform at least a portion of the functionality described herein. The management application 104 may include an update module 110 and/or a testing module 112. These modules may be executable to generate and store one or more software application dependency trees 114, which may be used by the management application 104 while performing one or more functions. For example, the update module 110 may be configured to generate a software application dependency tree 114 and execute (or otherwise call upon) the testing module 112. The testing module 112 may be configured to perform testing with respect to one or more of the software applications 108 based on the software application dependency trees 114. In some cases, this may involve obtaining a testing template associated with an indicated type of dependency and executing that testing template. A testing template may be provided by a software developer and may include a script or other series of commands which specify a number of actions to be executed in a particular order.

One illustrative example involving the computing device 102 of FIG. 1 can involve a scenario in which an update 116 to the target application 106 is received by the computing device 102. In this exemplary scenario, a remote server that provides backend support for the target application 106 may determine that a new version of the target application 108 is available and may push an update patch to the computing device 102. In another illustrative example, a software developer wishing to test new functionality may create an update 116 to the target application 106 to be tested on the computing device 102. The update 116 may be detected by the management application 104, which may perform one or more of the techniques described herein prior to applying the received update 116 to the target application 106.

Upon detecting the update 116, an update module 110 of the management application 104 may obtain a software application dependency tree 114 for the target application 106. In some cases, the update module 110 may generate a software application dependency tree 114 using a process in accordance with examples described herein. In this process, the update module 110 parses a specification for the target application 106 to identify software applications 108 upon which the target application 106 is dependent, generates a software application dependency tree 114 for the target application 106 that includes the nature of those dependencies, recursively generates software application dependency trees for each of the identified software applications 108, and includes the generated software application dependency trees for each of the identified software applications 108 into the software application dependency tree 114 for the target application 106.

Once the update module 110 has generated a software application dependency tree 114, the update module 110 may execute a testing module 112. In this scenario, the testing module 112 may perform tests with respect to software applications included within the software application dependency tree 114. To do this, the testing module 112 may, for each indicated dependency in the software application dependency tree 114, determine a relevant software application and a type of dependency. The testing module 112 may then, for each indicated dependency in the software application dependency tree 114, obtain a testing template associated with the type of dependency and execute that testing template. For example, if the software application dependency tree 114 indicates that Software A (the target application 106) calls upon Library Y of Software B (an example software application 108), then the testing module 112 may retrieve from memory a testing template used to test containers used by Software A and may subsequently execute that testing template. By way of illustration, the testing module 112 may retrieve and execute a testing template that causes the computing device to move, rename, or otherwise make unavailable Library Y of Software B during (or before) execution of Software A. The testing module 112 may then record the results of the performed test. In some cases, this may involve retrieving and recording log data. In some embodiments, this may involve recording whether the error handling performed by Software A is adequate (e.g., whether Software A performed a graceful exit).

Upon completing tests with respect to each of the software applications 108, the testing module may provide a record of test results to the update module 110. In some embodiments, the update module 110 may allow the update 116 to be applied to the target application 106 if no critical errors are detected by the testing module 112. In some embodiments, the update module 110 may provide a recommendation to a user of the computing device 102 based on the record of test results and may allow the update 116 to be applied to the target application 106 upon receiving a response from the user to do so.

For clarity, a certain number of components are shown in FIG. 1. But other examples may include more than one of each component. In addition, some examples may include more, fewer, or different components than are shown in FIG. 1. In addition, the components in FIG. 1 may communicate via any suitable communication medium (including the internet), using any suitable communication protocol.

Figure 2A:
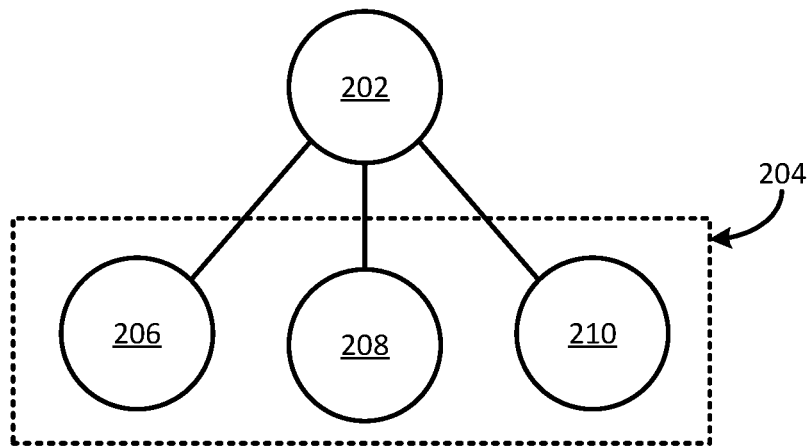
FIG. 2A depicts an example of a software application dependency tree during a first recursion of a process for generating the software application dependency tree according to some aspects.
Figure 2B:
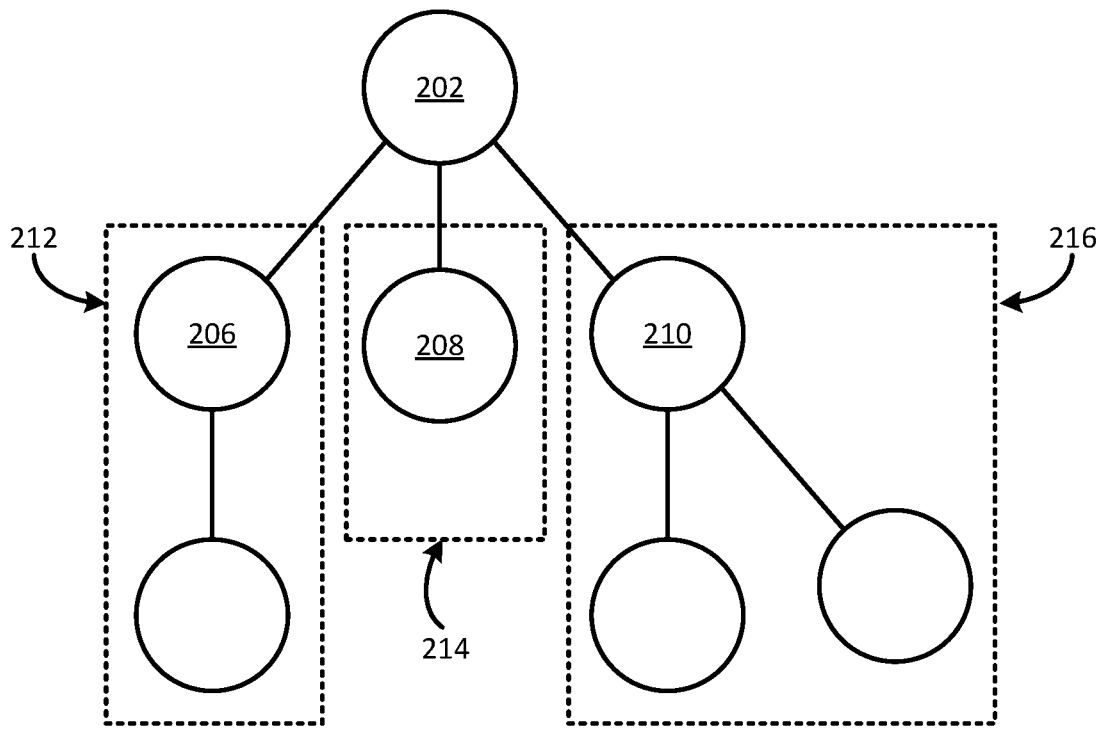
FIG. 2B depicts an example of a software application dependency tree incorporating a second recursion of the process for generating the software application dependency tree according to some aspects.

FIG. 2 depicts an example of a software application dependency tree at different points during a process for generating the software application dependency tree accordance with some aspects. FIG. 2A depicts the software application dependency tree during a first recursion and FIG. 2B depicts the software application dependency tree during a second recursion. While the software application dependency is depicted in FIG. 2 as a dependency tree having nodes and branches, it should be noted that this representation is merely being presented for illustrative purposes. One skilled in the art would recognize that any structure/format capable of storing relationships between entities may be used, and should be considered equivalent to the structure/format depicted.

As mentioned above, FIG. 2A depicts an example of a software application dependency tree during a first recursion of a process for generating the software application dependency tree. During the process for generating the software application dependency tree, the system may first incorporate a target software application for which the software application dependency tree is being generated at a first incorporation point 202. In some embodiments, information related to the target software application may be included in a root node of the software application dependency tree.

The process for generating the software application dependency tree may involve opening a software specification for the target software application and parsing the information included in the software specification to identify resources used by that target software application. At least some of the resources identified within the software specification may be associated with other software applications. Upon identifying resources associated with other software applications, the process for generating the software application dependency tree may involve adding incorporation points (e.g., 206, 208, and 210) for each of the other software applications associated with the identified resources. The incorporation points may be added on the same level 204 of the dependency tree. Additional information related to the resources and/or software application may be included in the respective incorporation point.

If none of the resources identified within the software specification are determined to be associated with other software applications, then the process for generating the software application dependency tree may end and return the software application dependency tree in its current form (having only the target software application). If at least some of the resources identified within the software specification are determined to be associated with other software applications, then the process for generating the software application dependency tree may recursively call the process for generating the software application dependency tree for each of the other software applications, with those other software applications being treated as the target software application in each of the recursively called processes. This is further discussed below.

FIG. 2B depicts an example of the software application dependency tree incorporating a second recursion of the process for generating the software application dependency tree. In FIG. 2A the process for generating the software application dependency tree may have been recursively called for each of the other software applications as described above. In response, the system may have received a number of software application dependency trees (e.g., 212, 214, and 216); one for each of the identified software applications. In some embodiments, a received software application dependency tree may include only the related software application. For example, the related software application may not be dependent upon any other software applications.

Upon receiving the number of software application dependency trees 212, 214, and 216, the system may incorporate each of those received software application dependency trees 212, 214, and 216 into the current software application dependency tree at their respective incorporation points 206, 208, and 210. This may involve appending or otherwise recording information associated with a respective software application dependency tree at the respective incorporation point.

Figure 3:
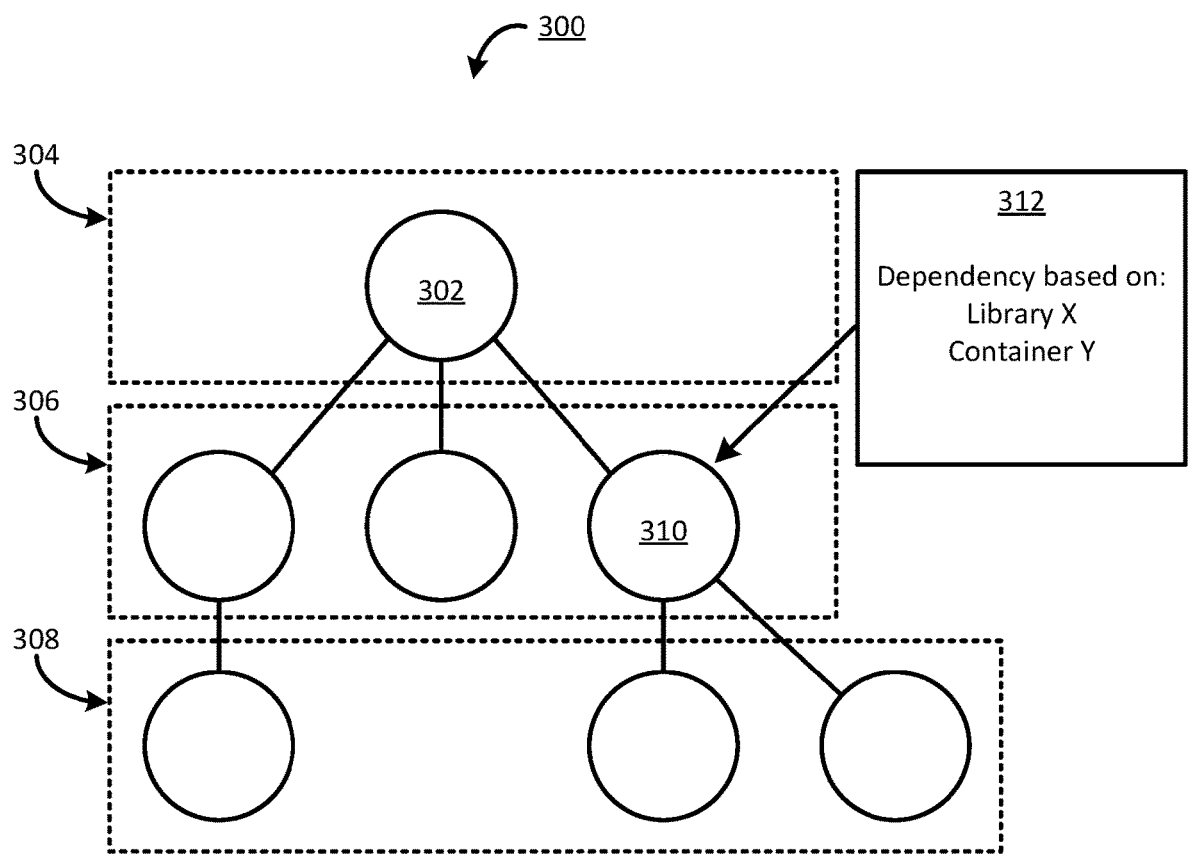
FIG. 3 depicts an example of a software application dependency tree generated according to some aspects.

One example of the software dependency tree after the above recursive process is shown in FIG. 3. The software application dependency tree 300 may include a number of nodes (depicted as circles in FIG. 3) which each represent a software application. The software application dependency tree 300 includes information associated with a target software application in a first node 302. The software application dependency tree 300 includes multiple additional levels, where software applications represented by nodes in each level are depended upon (or dependent upon in some cases) software applications represented by nodes in the level above it. In the depicted example, the target software application may depend upon the software applications represented by nodes in level 306, which may in turn depend upon the software applications represented by nodes in level 308.

Additionally, each node of a software application dependency tree 300 may include an indication of the nature of the dependency between the software applications. For example, a node 310 may store information 312, which includes an indication of the nature of the dependency. For example, the information 312 may indicate that the target software application uses Library X and Container Y associated with the software represented by the node 310. The information 312 may further be used during an automated testing process, which is described in greater detail elsewhere herein.

It should be noted that the software application dependency tree 300 is merely a graphical representation of information stored about relationships between various software applications. One skilled in the art would recognize that a software application dependency tree could be represented and/or stored in a number of equivalent ways, and the present disclosure is not limited to dependency trees.

Figure 4:
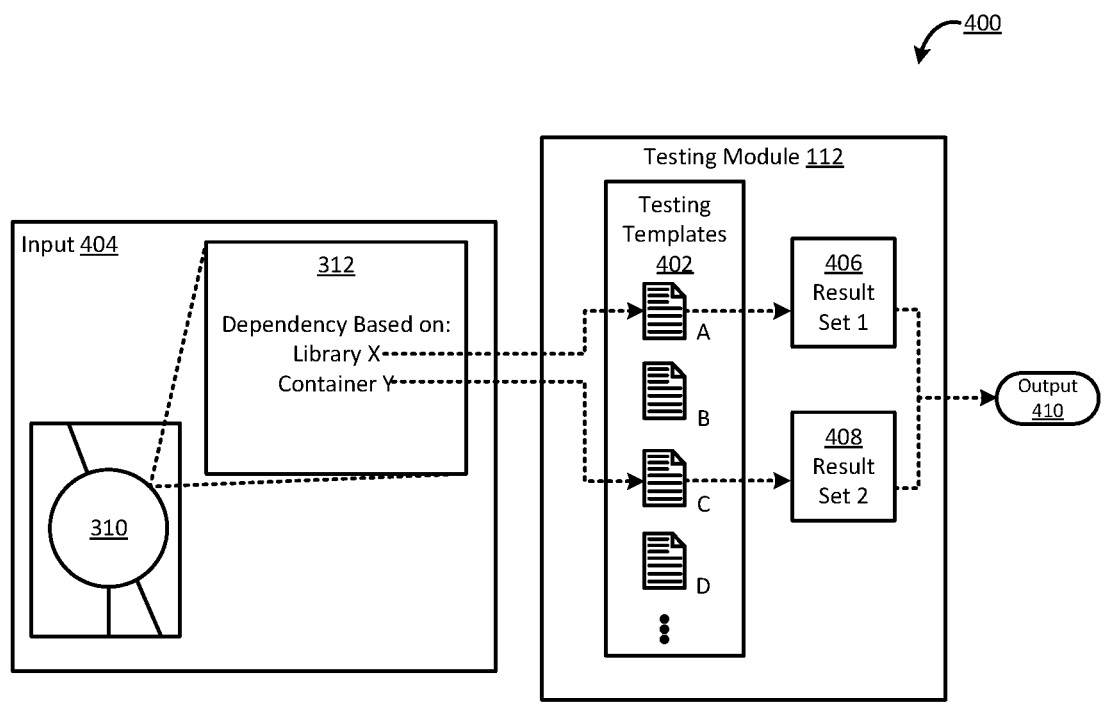
FIG. 4 is a block diagram of an example of a process for selecting and executing testing templates according to some aspects.

Once the software application dependency tree 300 has been created, a testing process may be executed using testing templates. The testing templates can be selected based on the software application dependency tree 300. FIG. 4 depicts a block diagram of an example of a process for selecting and executing testing templates in accordance with some aspects. The process 400 may be performed by the testing module 112 discussed above in relation to FIG. 1.

As described earlier, the testing module 112 may have access to a number of testing templates 402, which may be stored in memory of a computing device upon which the testing module 112 is hosted. The testing templates 402 may include a script or other series of commands to be executed in order to test a particular piece of software. The testing templates 402 may be generated and/or provided by a developer of the target application to which they relate. In some embodiments, the testing templates 402 may include a number of different testing templates, each of which include some condition or category under which the testing template is relevant. For example, the testing templates 402 may include a testing template which is relevant to a specific category of libraries. That testing template may be selected upon determining that a dependency associated with a particular node of the software application dependency tree involves one or more libraries that fall within that category. It should be noted that a single dependency may be relevant to a number of different testing templates from the testing templates 402.

The process 400 may be performed once or numerous times during an automated testing of software in relation to a software application data dependency tree. For example, the process 400 may be performed once for each software application included in the software application data dependency tree. In process 400, the testing module may receive, as input 404, information contained within a portion of a software application data dependency tree. For example, the process 400 may be performed with respect to a particular node of the software application dependency tree. the testing module 112 may then select one or more testing templates based on dependency information associated with that node. For example, the testing module 112 may receive as input 404 information 312 included within node 310 of the software application dependency tree depicted in FIG. 3 above. As described above, the information 312 may indicate that a target application uses Library X and Container Y associated with the software represented by the node 310. Based on this indication, the testing module 112 may determine that testing template A is to be used to test the target software application when it uses a library (or a type of library into which Library X falls). The testing module 112 may also determine that testing template C is to be used to test the target software application when it uses a container (or a type of container into which Container Y falls).

Upon identifying one or more relevant testing templates from the group of available testing templates 402 based on information received as input 404, the testing module 112 may execute automated testing for the target software application. This may involve instantiating an instance of the target software application in accordance with a script or other instructions included in the testing template 402. The automated testing may additionally or alternatively involve the use of testing software which mimics human behavior (e.g., manipulates objects via a graphical user interface) according to the testing template. As each testing template is executed, results from the testing template may be recorded to a result set. For example, upon execution of testing template A, a first result set 406 may be generated which indicates results of the operations performed during execution of testing template A. Similarly, upon execution of testing template C, a second result 408 set may be generated which indicates results of the operations performed during execution of testing template C. These result sets may be compiled and used to generate an output 410, which may be provided as a response to the execution of the testing module 112. In some embodiments, the output 410 may be a notification that is provided to a developer or host of the target software application that includes some portion of the result sets 406 and 408 and/or some conclusion derived from those results.

Figure 5:
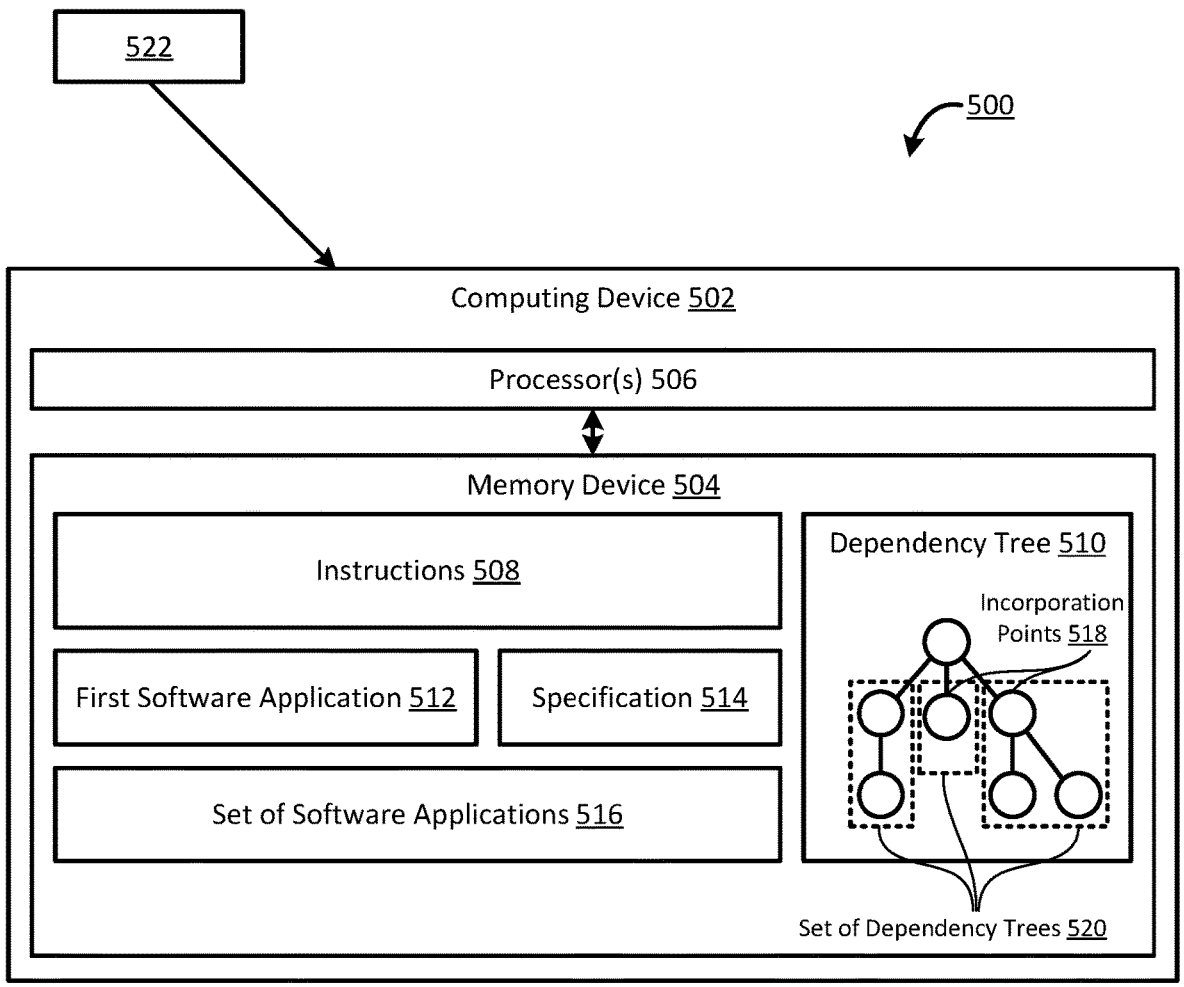
FIG. 5 is a block diagram of another example of a system for generating software application dependency data and implementing automated testing using such according to some aspects.

FIG. 5 is a block diagram of another example of a system 500 for generating software application dependency data and implementing automated testing using the software application dependency data according to some aspects. The system 500 includes a computing device 502 communicatively coupled with a memory device 504. The computing device 502 can include one processor or multiple processors. Non-limiting examples of the processor 506 include a Field-Programmable Gate Array (FPGA), an application-specific integrated circuit (ASIC), a microprocessor, etc. The processor 506 can execute instructions 508 stored in the memory device 504 to perform operations. In some examples, the instructions 508 can include processor-specific instructions generated by a compiler or an interpreter from code written in any suitable computer-programming language, such as C, C++, C#, etc.

The memory device 504 can include one memory device or multiple memory devices. The memory device 504 can be non-volatile and may include any type of memory device that retains stored information when powered off. Non-limiting examples of the memory device 504 include electrically erasable and programmable read-only memory (EEPROM), flash memory, or any other type of non-volatile memory. In some examples, at least some of the memory device 504 can include a medium from which the processor 506 can read instructions 508. A computer-readable medium can include electronic, optical, magnetic, or other storage devices capable of providing the processor 506 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 508.

In some examples, the computing device 502 may receive and process a request 522 to generate a dependency tree 510 with respect to a first (target) software application 512. To do this, the computing device 502 may locate a software specification 514 for the target software application. In some embodiments, the software specification 514 may be stored in a data store along with other software specifications. In some embodiments, the software specification may be stored in a folder or file associated with the target software application. Upon locating the software specification 514 associated with the target software application, the computing device 502 may parse that software specification 514 to identify any dependencies of the target software application on various resources. The computing device 502 may then identify a set of software applications 516, other than the target software application, which are associated with the identified resources. The computing device 502 may generate a dependency tree 510 associated with the first software application 512 that initially includes a root node having information associated with the first software application 512. The computing device 502 may then add a number of incorporation points 518 to the dependency tree 510 (e.g., at a root node) corresponding to the identified set of software applications 516 (one incorporation point for each software application in the set of software applications 516). The computing device 502 may then recursively call the process to generate a software application dependency tree for each of the identified software applications, resulting in a the generation of a set of dependency trees 520. The system may then incorporate each of the set of dependency trees 520 into the dependency tree 510 associated with the first software application 512 at the respective incorporation point 518. Once this has been done for all of the identified software applications in the set of software applications 516, the dependency tree 510 may be returned in response to the received request.

In some examples, the computing device 502 may further provide automated testing of a target software application using the generated software application dependency tree. In some embodiments, the computing device 502 may receive a request to complete testing for the target software application and may initially execute the process described above to generate a software application dependency tree with respect to the target software application. Upon receiving a dependency tree associated with the target software application as a result of that process, the computing device 502 may select a number of testing templates to be used in automated testing. In some embodiments, the computing device 502 may identify some number of testing templates from a set of testing templates stored in relation to the target software application for each node in the software application dependency tree for the target software application. In some embodiments, the testing templates identified with respect to each node may be selected based on dependency information included in the node. For example, selection of testing templates may be made based upon an indication of one or more of files, services, or containers of the respective software application upon which the first software application is dependent. Once appropriate testing templates have been selected, the computing device may execute the selected testing templates and results of the operations performed via the testing templates may be recorded as output to the testing template. The computing device may run automated tests by, for each level of the dependency tree, sequentially executing all testing templates identified for nodes on each level of the dependency tree. Once all of the testing templates have been executed, the results may be aggregated and reported out, which may result in an output file being provided in response to the received request.

FIG. 6 is a flow chart of an example process for generating a software application dependency tree according to some aspects. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). The steps of FIG. 6 are discussed below with reference to the components discussed above in relation to FIG. 5.

The process 600 may begin at 602, when a request 522 is received to generate a dependency tree 510 relating to a first (e.g., target) software application 512.

At 604, the process 600 may involve identifying a set of software applications 516 upon which the first software application 512 is dependent. This may involve parsing through a software specification 514 associated with the first software application 512 to identify dependencies within that software specification 514. The dependency tree 510 may be made to include only the first software application 512 if the set of software applications 516 is empty (e.g., no software applications are identified as being depended upon by the first software application 512).

The process 600 may involve submitting, for each of the software applications in the set of software applications 516, a new request to generate a dependency tree. In each of these new requests, the respective software application may be treated as the target software application.

At 606, the process 600 may involve receiving, with respect to the identified set of software applications 516, a corresponding set of dependency trees 520.

At 608, the process 600 may involve incorporating each of the received dependency trees into the dependency tree 510 for the first software application 512. In some examples, this may involve generating a number of incorporation points 518 in the dependency tree 510 for the first software application 512 and adding each of the received dependency trees for the set of software applications 516 to the dependency tree 510 at its respective incorporation point. Each incorporation point of the dependency tree 510 may include information about a dependency of the first software application 512 upon a respective software application associated with the incorporation point. In some embodiments, the information about the dependency of the first software application 512 upon the respective software application may include an indication of one or more of files, services, or containers of the respective software application upon which the first software application 512 is dependent.

At 610, the process 600 may involve returning the dependency tree 510 in response to the received request 522. In some examples, the process 600 may further involve performing testing operations using the dependency tree 510 for the first software application 512. To do this, the process 600 may further involve testing at least a portion of the functionality of each of the software applications included in the dependency tree 510 for the first software application 512. The target application and/or the respective software application may be executed in accordance with an associated testing template. In some examples, each of the software applications included in the dependency tree 510 for the first software application 512 may be tested in an order determined based on a position of the software application within the dependency tree 510 for the first software application 512. For example, each of the software applications on a particular level of the dependency tree 510 for the first software application 512 may be tested before the each of the software applications on a level dependent upon the particular level.

Some examples of this disclosure provide for a number of advantages over conventional systems. For instance, systems described herein can quickly and accurately generate a software application dependency tree for any type of target software application that subsequently enables more thorough testing of that target software application. Additionally, by including a nature of each of the dependencies in the software application dependency tree, the system can refine automated testing in a manner which conventional systems cannot achieve. For example, the system can select and automatically test scenarios relevant to a particular software application, reducing additional processing resources that would be needed by conventional systems which run all testing templates.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) or features described herein can be combined with any other example(s) or features to yield further examples. A recitation of "a", "an" or "the" is intended to mean "one or more" unless specifically indicated to the contrary.

The invention claimed is:

1. A system comprising:
a processor; and
a memory including instructions that are executable by the processor for causing the processor to:
receive a request to generate a dependency tree for a target software application;
identify a set of software applications on which the target software application is dependent based on information included in a specification for the target software application;
generate the dependency tree for the target software application, the dependency tree including a plurality of nodes corresponding to the set of software applications, wherein each node in the plurality of nodes includes first textual information specifying a respective software application in the set of software applications on which the target software application is dependent, wherein each node in the plurality of nodes also includes second textual information specifying a subpart of the respective software application on which the target software application is dependent, wherein the subpart is a library, a file, a service, or a container of the respective software application on which the target software application is dependent, and wherein a single node of the plurality of nodes includes the first textual information specifying the respective software application on which the target software application is dependent and includes the second textual information specifying at least two subparts of the respective software application on which the target software application is dependent; and test the target software application using the dependency tree by, for at least one node of the plurality of nodes in the dependency tree:

extracting the second textual information from the at least one node;

selecting a predefined testing template from among a plurality of predefined testing templates based on the subpart specified in the second textual information; and testing at least a portion of the target software application by executing the predefined testing template.

2. The system of claim 1, wherein the memory further includes instructions that are executable by the processor for causing the processor to test the target software application by executing a respective testing template corresponding to each subpart included in the dependency tree in an order determined based on a position of a corresponding software application within the dependency tree.

3. The system of claim 2, wherein the memory further includes instructions that are executable by the processor for causing the processor to test the target software application based on all of the software applications on a particular level of the dependency tree before testing the target software application based on any of the software applications on a level dependent upon the particular level.

4. The system of claim 1, wherein the memory further includes instructions that are executable by the processor for causing the processor to, for a node of the plurality of nodes in the dependency tree:

extract the second textual information from the node;

determine, based on the second textual information, a type of dependency between the target software application and the respective software application represented by the node;

select a testing template from among a group of testing templates based on the type of dependency, wherein the group of testing templates includes different testing templates for different types of dependencies associated with the respective software application; and test at least a portion of the target software application by executing the respective testing template.

5. The system of claim 1, wherein the subpart includes one or more containers of the respective software application upon which the target software application is dependent.

6. The system of claim 1, wherein a node of the plurality of nodes includes additional information indicating a type of dependency between the target software application and the respective software application that corresponds to the node.

7. The system of claim 1, wherein the predefined testing template is configured for causing the subpart to be made unavailable to the target software application.

8. The system of claim 7, wherein the predefined testing template is configured for causing the subpart to be shutdown or renamed.

9. The system of claim 1, wherein the at least two subparts include a first type of subpart and a second type of subpart that is different from the first type of subpart.

10. A method comprising:

receiving, by a computing device, a request to generate a dependency tree for a target software application;

identifying, by the computing device, a set of software applications on which the target software application is dependent based on information included in a specification for the target software application;

generating, by the computing device, the dependency tree for the target software application, the dependency tree including a plurality of nodes corresponding to the set of software applications, wherein each node in the plurality of nodes includes first textual information specifying a respective software application in the set of software applications on which the target software application is dependent, wherein each node also includes second textual information specifying a subpart of the respective software application on which the target software application is dependent, wherein the subpart is a library, a file, a service, or a container of the respective software application on which the target software application is dependent, and wherein a single node of the plurality of nodes includes the first textual information specifying the respective software application on which the target software application is dependent and includes the second textual information specifying at least two subparts of the respective software application on which the target software application is dependent; and testing, by the computing device, the target software application using the dependency tree by, for at least one node of the plurality of nodes in the dependency tree:

extracting the second textual information from the at least one node;

selecting a predefined testing template from among a plurality of predefined testing templates based on the subpart specified in the second textual information; and testing at least a portion of the target software application by executing the predefined testing template.

11. The method of claim 10, further comprising testing the target software application by executing a respective testing template corresponding to each subpart included in the dependency tree in an order determined based on a position of a corresponding software application within the dependency tree.

12. The method of claim 10, further comprising testing the target software application based on all of the software applications on a particular level of the dependency tree before testing the target software application based on any of the software applications on a level dependent upon the particular level.

13. The method of claim 10, wherein each node of the dependency tree comprises additional information about a dependency of the target software application upon the respective software application associated with the node.

14. The method of claim 10, wherein the subpart includes one or more containers of the respective software application upon which the target software application is dependent.

15. The method of claim 10, wherein the dependency tree for the target software application comprises only the target software application if the set of software applications is empty.

16. The method of claim 10, wherein a node of the plurality of nodes includes additional information indicating a type of dependency between the target software application and the respective software application that corresponds to the node.

17. A non-transitory computer-readable medium comprising program code executable by a processing device for causing the processing device to:

receive a request to generate a dependency tree for a target software application;

identify a set of software applications on which the target software application is dependent;

receive a set of dependency trees corresponding to the set of software applications;

combine the set of dependency trees into the dependency tree for the target software application at a plurality of nodes corresponding to the set of software applications, wherein each node of the plurality of nodes includes first textual information specifying a respective software application in the set of software applications and includes second textual information that specifies a subpart of the respective software application on which the target software application is dependent, wherein a single node of the plurality of nodes includes the first textual information specifying the respective software application and includes the second textual information specifying at least two subparts of the respective software application on which the target software application is dependent; and test the target software application using the dependency tree by, for each node of the plurality of nodes:

extracting the second textual information from the node;

selecting a respective testing template from among a group of testing templates based on the subpart specified in the second textual information contained in the node; and testing at least a portion of the target software application by executing the respective testing template.

18. The non-transitory computer-readable medium of claim 17, further comprising program code that is executable by the processing device for causing the processing device to test the target software application by:

selecting at least two testing templates based on and corresponding to the at least two subparts identified in the second textual information of the single node; and executing the at least two testing templates to test the target software application based on at least two subparts.

19. The non-transitory computer-readable medium of claim 17, wherein the at least two subparts include a first type of subpart and a second type of subpart that is different from the first type of subpart.

20. The non-transitory computer-readable medium of claim 19, wherein the first type of subpart is a library and the second type of subpart is a container.

* * * * *